Patented July 14, 1953

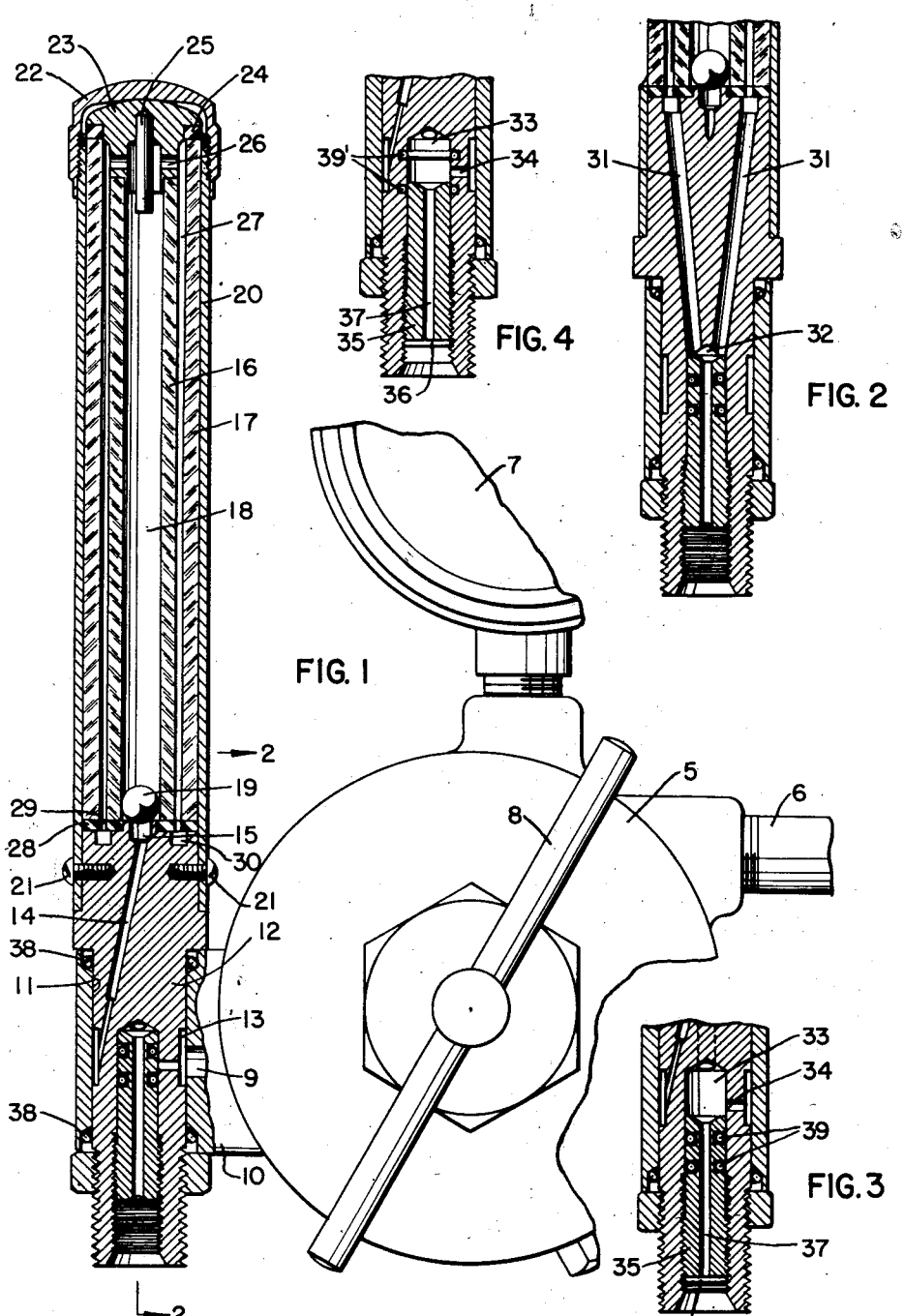

2,645,124

UNITED STATES PATENT OFFICE 2,645,124

FLOWMETER FOR GASES

John S. Senesky, Somerville, N. J., assignor to Air Reduction Company, Incorporated, New York, N. Y., a corporation of New York Application May 19, 1949, Serial No. 94,121

2 Claims. (Cl. 73—209)

This invention relates to flow meters and particularly to devices adapted to measure the rate of flow of gases supplied from a source thereof under pressure. Usually such gases are delivered through a pressure-reducing valve or regulator in which the initial pressure of the gas is lowered to a pressure of predetermined value.

Flow meters of various types are known. One type is illustrated in the Deming Patent No. 2,023,008 and embodies a tube and a floating ball which is displaced in the tube, depending upon the rate of flow of the gas. By suitable calibration, such a device may be made to measure the rate of flow of a particular gas. The Bourdon flow meter operates on a different principle, and other devices are also available.

All of these devices are subject to the disadvantage that they cannot be used satisfactorily for measuring interchangeably the rate of flow of gases of substantially different density such, for example, as helium and argon. If calibrated for one, a different calibration is required for the other, and the possible range of calibration is such that even if two or more scales are provided, one or more of the scales will have a range so limited that it is not useful for practical purposes.

In many operations, two or more gases may be used, and it is convenient to have a flow meter which can be employed with more than one gas. Thus, in shielded arc welding it is necessary to regulate the rate of flow of the shielding gas to afford the best shield for the arc. Argon, helium and other gases may be used in such operations, and it is desirable to avoid the necessity for changing the flow meter on the equipment whenever a change is made in the gas used.

In most other meters, the flow measurements of a gas are accurate over only a portion of the full range of flows that may be encountered. When the rate of flow of the gas is such as to be at either end of the calibrated scale, discrepancies enter into the readings. One common expedient to overcome this difficulty is the use of different flow meters for different ranges of flow rate, so that the accuracy of measurement of each flow meter in the range for which it is calibrated may be retained. This requires the maintenance of additional equipment.

It is the object of the invention to provide a flow meter which is capable of measuring the rates of flow of more than one gas and which will indicate a wide range of flow for each gas.

Another object of the invention is the provision of a flow meter which will measure the rate of gas flow accurately over different flow ranges.

Other objects and advantages of the invention will be apparent as it is better understood by reference to the following specification and the accompanying drawings, in which Fig. 1 is a view partially in elevation and partially in section illustrating a pressure-reducing valve with the flow meter attached thereto;

Fig. 2 is a section on the line 2—2 of Fig. 1;

Fig. 3 is a section of the lower end of the flow meter showing the adjustment thereof; and Fig. 4 is a view similar to Fig. 3 showing a slightly modified form of the apparatus.

While the invention is described more particularly with reference to a flow meter of the floating ball type, it is equally applicable to other devices intended for the same purpose, depending as it does, not upon the particular flow meter used, but upon the measurement of the rate of flow of a part only of the gas delivered, that is to say, with a gas of one density the device may be used without a bypass connection, and with a gas of another density the bypass connection may be open so that only a portion of the gas passes through the flow meter.

Referring to the drawing, 5 indicates a regulator or pressure-reducing valve of the ordinary type having an inlet 6 which is adapted to be connected to a cylinder or other container for gas under substantial pressure. The details of the pressure-reducing valve are well known and require no specific description. A pressure indicator 7 indicates the initial pressure of the gas and, by manipulation of a handle 8, the valve may be adjusted so that the gas issues through an outlet 9 at a predetermined lower pressure. The regulator 5 is provided with a boss 10 in which the outlet 9 is formed.

The boss 10 is provided with an opening 11 to receive the shank 12 of the flow meter. The shank has an annular depression 13 registering with the outlet 9 so that the gas delivered from the regulator 5 may be delivered to a passage 14 extending to a recess 15 at the top of a shank.

Above the shank 12, two transparent tubes 16 and 17 of glass or other suitable material are arranged co-axially. The inner tube 16 has a chamber 18 of gradually increasing cross-sectional area from the bottom upwardly to the top. A ball 19 is disposed in this chamber and normally rests upon the opening to the recess 15. The tubes 16 and 17 are surrounded by a casing 20 of metal or other suitable material which is secured to the shank 12 by screws or other fastening means 21. A cap 22 is threadedly secured at the upper end of the casing 20 and holds the stopper 23 in close engagement with the upper ends of the tubes 16 and 17. A gasket 24 surrounds the upper edge of the outer tube 17 to afford a gas-tight joint, and a pin 25, depending from the stopper 23, limits the upward movement of the ball 19. Passages 26 in the stopper 23 afford communication between the chamber 18 and the chamber 27 between the tubes 16 and 17. Gasket 28 is disposed between the lower ends of the tubes 16 and 17 and the end of the shank 12, to afford gas-tight connections, and the chamber 27 communicates through openings 29 in the gasket 28 with an annular recess 30 in the end of the shank. From this recess, passages 31 (Fig. 2) converge in the shank 12 to a recess 32.

The lower end of the shank is counter-bored and threaded to form a chamber 33 (Fig. 3). A passage 34 connects the chamber 33 with the annular depression 13. A plug 35 is threadedly mounted in the chamber 33 and may be adjusted by means of a screw driver or other tool engaging a slot 36 at the bottom of the plug. A passage 37 extends through the plug 35 to the chamber 33. Hence, when the plug 35 is in the position indicated in Figs. 1 and 2, all of the gas from the outlet 9 passes through the recess 13 and the passage 14 to the chamber 18 of the flow meter and the ball 19 is lifted in accordance with the rate of flow. By suitable calibration, the rate of flow can thus be read directly. The gas continues through the passages 24 to the chamber 27 and thence through the passages 31 to the passage 37 in the plug 35. The gas may be delivered thence to the point where it is used. When the plug 35 is withdrawn to the position indicated in Fig. 3, a portion of the gas from the outlet 19 and the annular recess 13 is diverted through the passage 34 and thus to the passage 37, while a portion only follows the path hereinbefore described through the flow meter. Thus, with a light gas such as helium, the plug 35 should be disposed in the position indicated in Figs. 1 and 2. All of the gas thus passing through the flow meter will lift the ball 19 and afford a direct reading of the rate of flow by suitable calibration. When a heavier gas such as argon is to be used, it is necessary merely to move the plug 35 to the position indicated in Fig. 3. In this case, only a portion of the gas supplied passes through the flow meter to lift the ball 19 and by suitable calibration the rate of flow can be immediately determined. The range of the scale will be ample in either case to measure the rates of flow of both gases with adequate accuracy. The modification of the apparatus for measuring different gases is accomplished by the application of a simple tool and the operation thereof, it being no longer necessary to employ separate flow meters.

Obviously such an apparatus must provide gas-tight connections to avoid leakage. Preferably, a doughnut type annular packing 38 is provided in suitable recesses between the shank 12 and the boss 10. Similarly, annular packing of the doughnut type 39 is provided in recesses in the plug 35 to prevent escape of gas around the periphery thereof. As shown in Fig. 4, the packing 39' may be disposed in recesses in the wall of the shank 12 surrounding the plug 35.

The apparatus as described affords a simple solution of the problem of measuring the rates of flow of gases of substantially different density in a single apparatus so that the necessity for providing a plurality of flow meters and for constantly substituting them in the apparatus is avoided. Moreover, the range of flow rates as well as the accuracy of measurement thereof is greatly improved.

Various changes may be made in the form, arrangement and structure without departing from the invention or sacrificing the advantages thereof.

I claim:

1. In a flow meter of the variable orifice type capable of measuring the rate of flow of gases including vertical tubular means and a cooperating float element located therein to provide a variable orifice, said flow meter having inlet and outlet passages, an elongated member secured to the flow meter to support said flow meter, said elongated member having a gas inlet passage and a gas outlet passage connected respectively to the inlet and outlet passages of said flow meter, a portion of the outlet passage in said elongated member being threaded, said member further having a by-pass passage connecting the inlet and outlet passages therein, and a plug disposed in the outlet passage of the elongated member having an outer threaded portion whereby said plug may be threaded inwardly and outwardly in said passage to close or open said by-pass passage, said plug having an opening extending longitudinally therethrough and forming a part of the gas outlet passage in said elongated member.

2. In a flow meter of the variable orifice type capable of measuring the rate of flow of gases including vertical tubular means and a cooperating float element located therein to provide a variable orifice, said flow meter having inlet and outlet passages, an elongated member secured to the flow meter to support said flow meter, said elongated member having a gas inlet passage and a gas outlet passage connected respectively to the inlet and outlet passages of said flow meter, a portion of the outlet passage in said elongated member being threaded, said member further having a by-pass passage connecting the inlet and outlet passages therein, a plug disposed in the outlet passage of the elongated member having an outer threaded portion whereby said plug may be threaded inwardly and outwardly in said passage to close or open said by-pass passage, said plug having an opening extending longitudinally therethrough and forming a part of the gas outlet passage in said elongated member, and a sealing means, a portion of which surrounds the plug and engages the wall of the outlet passage of the elongated member upstream of the opening thereinto of the by-pass passage when the plug is in advanced position to prevent the passage of gas around the plug to that portion of the outlet passage immediately upstream of the plug when in said advanced position, another portion of the sealing means always surrounding the plug and engaging the wall of the outlet passage downstream of the opening thereinto of the by-pass passage to prevent at all times the passage of gas from the by-pass passage around the plug to the mouth of the outlet passage.

JOHN S. SENESKY.

References Cited in the file of this patent

UNITED STATES PATENTS

| Number | Name | Date |
|---|---|---|
| 400,331 | Graeser | Mar. 26, 1889 |
| 1,608,059 | Borde | Nov. 23, 1926 |
| 1,985,397 | Bassett | Dec. 25, 1934 |
| 2,023,008 | Deming | Dec. 3, 1935 |
| 2,087,279 | Deming | July 20, 1937 |
| 2,196,285 | Bachle | Apr. 9, 1940 |
| 2,457,297 | Aller | Dec. 28, 1948 |

FOREIGN PATENTS

| Number | Country | Date |
|---|---|---|
| 377,299 | France | July 6, 1907 |
| 435,297 | Great Britain | Sept. 18, 1935 |